Nov. 28, 1967   J. A. BOUTLAND ET AL   3,354,858
WATER-BORNE GAS-CUSHION VEHICLES
Filed April 4, 1966   2 Sheets-Sheet 1
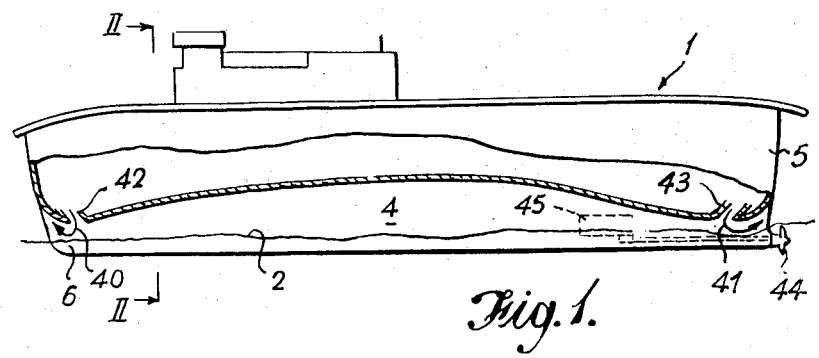
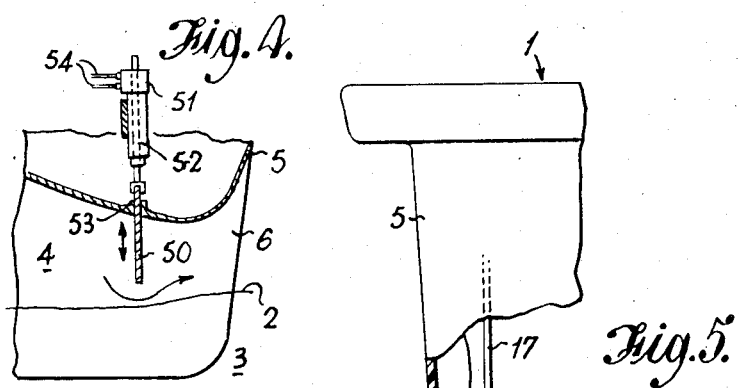
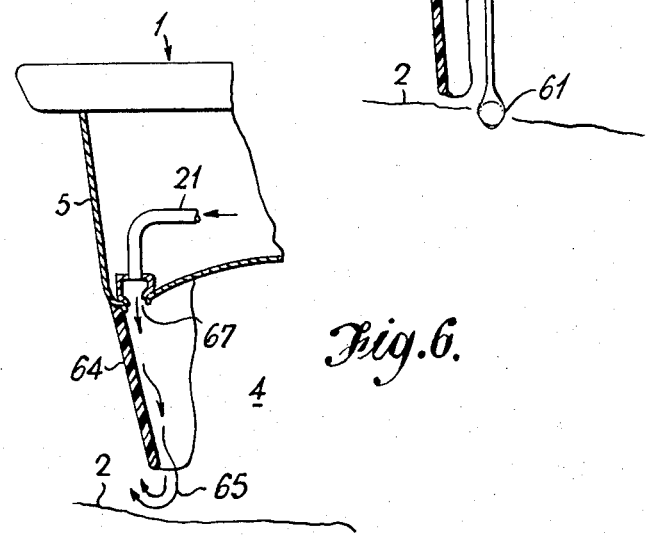
INVENTORS
J. A. BOUTLAND
S. T. JELLY
BY
Cameron, Kerkam & Sutton
ATTORNEYS

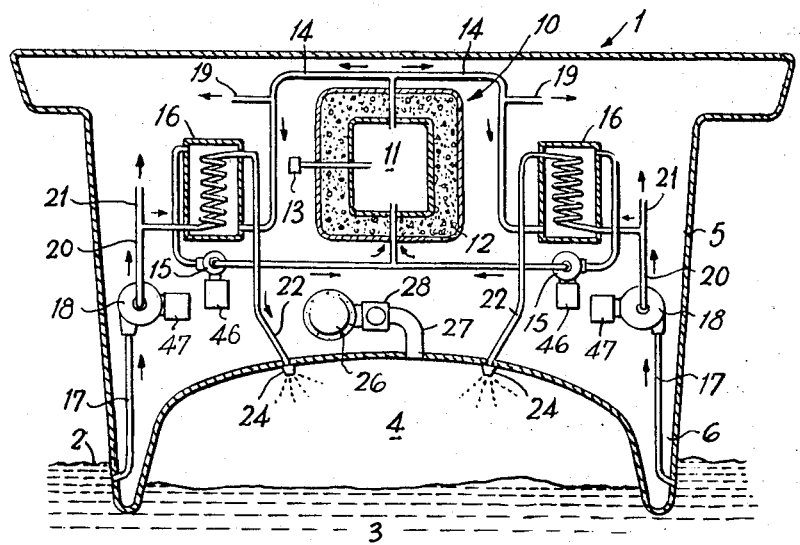

United States Patent Office 3,354,858
Patented Nov. 28, 1967

3,354,858
WATER-BORNE GAS-CUSHION VEHICLES
John Anthony Boutland, Hythe, Southampton, England, and Sidney Thomas Jelly, Ottawa, Ontario, Canada, assignors to Hovercraft Development Limited, London, England, a British company
Filed Apr. 4, 1966, Ser. No. 540,075
Claims priority, application Great Britain, Apr. 6, 1965, 14,614/65
10 Claims. (Cl. 114—67)

ABSTRACT OF THE DISCLOSURE

A gas-cushion type of vehicle for operation over water is supported by a cushion of steam formed and contained between the body of the vehicle and the water over which it travels. The steam is formed by taking in water from beneath the vehicle and raising its temperature by passing the water in heat exchange with the coolant circuit of a nuclear reactor, meanwhile keeping the water pressurised by means of a pump to prevent it evaporating. After the water has been raised in temperature it is sprayed into the relatively low pressure existing in the cushion space beneath the vehicle where it flashes into steam.

---

This invention relates to water-borne gas-cushion vehicles, that is to say, to vehicles which travel over the surface of water and which, in operation, are supported above that surface, at least in part, by a cushion of pressurised gas formed and contained in a space (the cushion space) beneath the body of the vehicle. In the context of the invention the term "gas" includes "steam."

Hitherto, a vehicle-supporting gas cushion has been formed by drawing in air from the atmosphere and then discharging this air, in a compressed condition, to the cushion space. This arrangement requires air fans of large capacity driven by internal combustion engines with the attendant disadvantages, for long-range operation, of the fan driving means consuming large volumes of fuel.

According to the invention, a water-borne gas-cushion vehicle is provided with means for forming a vehicle-supporting cushion of steam in the cushion space, said means comprising intake means for taking in water from beneath the vehicle, heating means for raising the temperature of the water taken in, pressurising means for raising the pressure of the water so as to prevent it boiling off when heated and discharge means for discharging the heated and pressurised water into the cushion space whereby it flashes into steam.

The heating means may conveniently comprise part of the coolant circuit of a nuclear reactor. This arrangement provides a vehicle with a very long operating range yet with an extremely small fuel consumption.

An embodiment of the invention will now be described by way of example with reference to the accompanying drawings, wherein:

FIGURE 1 is a side view, partly in section, of a vehicle,

FIGURE 2 is an enlarged section taken on the lines II—II of FIGURE 1,

FIGURE 3 is a view similar to that of FIGURE 2 and illustrates a modification thereof, and FIGURES 4, 5 and 6 are fragmentary views illustrating further modifications.

Referring to FIGURES 1 and 2, an aircraft-carrying gas-cushion vehicle 1 travels over the surface 2 of water 3, supported above the surface 2 by a cushion 4 of pressurised steam formed and contained in a space beneath the body 5 (or hull) of the vehicle. The vehicle 1 is of the "side-wall" type, the sides of the cushion 4 being contained by a pair of parallel-disposed side-walls 6 extending fore-to-aft along the sides of the vehicle body 5 and dipping into the water 3 below. The fore and aft ends of the cushion 4 are contained by water curtains 40, 41 (FIGURE 1 only) issuing from supply ports 42, 43 at the fore and aft ends of the vehicle body 5 and extending cross-wise between the ends of the side-walls 6. The vehicle 1 is propelled by propellers 44 driven by engines 45 housed in the side-walls 6.

The vehicle body 5 houses a gas-cooled nuclear reactor 10, comprising a graphite-moderated reactor core 11, core shielding 12 and a control/shutdown rod system 13. Helium gas coolant is circulated in two identical closed circuits 14 by pumps 15. Each circuit 14 includes a heat exchanger 16. The pumps 15 are driven by gas turbines 46 using reactor coolant bled from the circuits 14 by tappings 19.

The side-walls 6 house water intake ducts 17 which connect with the inlets of water pumps 18. The pumps 18 are driven by gas turbines 47 using reactor coolant bled from the reactor coolant circuits 14 by tappings 19. Ducts 20 connect the outlets of the pumps 18 with the heat exchangers 16. The heat exchangers 16 are also connected, by way of ducts 22 penetrating the bottom surface 23 of the vehicle body, to water spray heads or nozzles 24 disposed in the space occupied by the cushion 4. High pressure air storage bottles 26 (one only being shown) are also connected to the cushion space through ducts 27 and associated control/shut-off valves 28. The bottles 26 are refilled by air compressors (not shown) adapted to be coupled to the gas turbines 46 or 47. The water supply ports 42, 43 (FIGURE 1) are connected to the outlets of the pumps 18 by branch ducts 21.

In operation, with the cushion 4 non-existent, and with the vehicle body 5 floating on the surface 2 of the water 3, the reactor 10 is made critical and the gas and water pumps 15, 18 started up. A vehicle-supporting air cushion of about .5 p.s.i.g. is initially formed by releasing high pressure air from the bottles 26 to beneath the vehicle body 5. The air cushion is contained by the side-walls 6 and the water curtains 40, 41. Subsequently the air cushion is replaced by the steam cushion 4 which is formed by steam generated by the "flash" principle whereby water, raised in pressure (to about 100 p.s.i.g.) by the pumps 18 and in temperature (to about 250° F.) by the heat exchangers 16, is discharged in spray form through the heads 24 into the relatively low pressure existing in the cushion space, whereby it "flashes" into low pressure steam. The rise in water pressure created by the pumps 18 is sufficient to prevent water in the heat exchangers 16 from boiling off.

Because of the relatively low pressures and temperatures imposed on the water taken in, corrosion and scale are not likely to provide much of a problem. Indeed, damage by corrosion can be resisted by the use of corrosion-resistant materials, for example, stainless steel and copper-nickel alloys. Scale can be kept under control by injection into the ducts 20 of recognised water treatment chemicals, for example, starch. The particular chemical selected will depend on the design of the system and the materials used.

In the modification illustrated in FIGURE 3, the steam cushion 4 obtains "re-heat" from the nuclear reactor 10. It is likely that free water in the form of spray generated by formation of the cushion 4 and by movement of the vehicle 1 through the water 3 will weaken the cushion by a condensing action. Hence, this free water (plus any steam present) is collected by scoops 30 at the lower ends of ducts 31 leading to pumps 32 driven by the gas turbines 49 supplied with gas from the tappings 19. The scoops 30 are disposed close to the regions where the side-walls 6 enter the water 3, i.e. where most of the spray is present. The pumps 32 pass the collected water through heat exchangers 33 where it is brought into heat exchange with reactor coolant in circuits 14 before being returned to the cushion space by way of a duct 34 terminating in a spray head or nozzle 37 whereby the collected water "flashes" into steam on re-entering the cushion space.

The scoops 30 can also be raised well above the level of the water surface 2 whereby steam rather than water is taken in from the cushion space and is given heat so that the cushion steam is used repeatedly.

In the modification illustrated in FIGURE 4, the aft water-curtain supply port 43 is dispensed with and the rear end of the cushion 4 is partially contained by a movable shutter 50. Steam is allowed to escape from the cushion 4 by way of a gap between the shutter 50 and the water surface 2 to impart, by reaction, a propulsive thrust on the vehicle 1. This thrust can either assist or replace the engine and propeller installation 44, 45 (FIGURE 1). The shutter 50 is moved in a vertical plane by axial movement, through an electrically-operated rotary actuator 51, of a screwed rod 52 attached to the top edge of the shutter 50. The shutter 50 is sealed to the vehicle body 5 by steam-tight seals 53. The actuator 51 is under the control, through electrical signal lines 54, of a vehicle operator.

Referring now to FIGURE 5, the side-walls 6 of the vehicle 1 are replaced by a flexible wall or skirt 60 of rubberised fabric projecting downwardly from the periphery of the vehicle body 5 to contain the steam cushion 4 and water to be turned into steam enters the intake ducts 17 by way of scoops 61 disposed adjacent the water surface 2.

In the modification of FIGURE 6, the steam cushion 4 is contained by the combination of a flexible wall or skirt 64 of rubberised fabric and a curtain 65 of water issuing from the bottom of the wall 60. The water forming the curtains 65 is supplied from an annular port 67 disposed immediately inboard of the wall 60. The port 67 is connected to the water pump discharge branch ducts 21 (see also FIGURES 2 and 3) and water flows from the port 67 down the inner surface of the wall 64 before leaving the bottom edge thereof to form the curtain 65.

We claim:

1. A water-borne gas-cushion vehicle provided with means for forming a vehicle-supporting cushion of steam in the cushion space, said means comprising intake means for taking in water from beneath the vehicle, heating means for raising the temperature of the water taken in, pressurising means for raising the pressure of the water so as to prevent it boiling-off when heated, and spray discharge means for spraying the heated and pressurised water into the cushion space where it flashes into steam.

2. A vehicle as claimed in claim 1 wherein the heating means include at least part of the coolant circuit of a nuclear reactor.

3. A vehicle as claimed in claim 2 wherein the reactor coolant is gas and said pressurizing means comprise at least one pump driven by gas turbine means supplied with gas bled from the reactor coolant circuit.

4. A vehicle as claimed in claim 1 wherein the sides of the vehicle-supporting cushion are contained by a spaced pair of walls extending along the sides of the vehicle body and dipping into the water beneath the vehicle, and wherein said intake means comprise ducts housed within said walls and terminating below the level of the water.

5. A vehicle as claimed in claim 4 wherein at least one end of the vehicle-supporting cushion is contained, at least in part, by a curtain of fluid which is composed, at least in part, of water.

6. A vehicle as claimed in claim 1 wherein each side of the vehicle-supporting cushion is contained, at least in part, by a flexible wall structure depending downwardly from the vehicle body and a curtain of fluid which is composed, at least in part, of water, which curtain issues from the bottom of said wall structure.

7. A vehicle as claimed in claim 1 having means additional to said intake means for collecting free water from the cushion space, means for applying heat and pressure to said collected water, and means for subsequently returning it, at least in part, in steam form to said cushion space.

8. A vehicle as claimed in claim 1 having means additional to said intake means for collecting steam from the cushion space, means for applying heat to said steam, and means for returning said steam to the cushion space.

9. A vehicle as claimed in claim 1 wherein the sides of the vehicle-supporting cushion are contained by a spaced pair of walls extending along the sides of the vehicle body and dipping into the water beneath the vehicle, and having shutter means extending laterally between the rear ends of the side walls, and means for moving said shutter means in a generally vertical direction towards and away from said water so as to allow a controlled escape of steam from said cushion space whereby a reactive thrust is applied to said vehicle.

10. A water-borne gas-cushion vehicle comprising means for containing a cushion of pressurised gas in a space beneath the body of the vehicle, means for supplying air under pressure to the cushion space to initially form a low pressure air cushion in said space, and means for subsequently forming a vehicle-supporting cushion of steam in the cushion space, said last-named means including intake means for taking in water from beneath the vehicle, heating means for raising the temperature of the water taken in, pressurising means for raising the pressure of the water so as to prevent it boiling off when heated, and means disposed in the cushion space for spraying the heated and pressurised water into the cushion space where it flashes into steam.

References Cited

UNITED STATES PATENTS

| | | | |
|---|---|---|---|
| 913,515 | 2/1909 | Lake | 114—67.1 |
| 3,001,500 | 9/1961 | Pinnes | 114—67.1 |
| 3,141,436 | 7/1964 | Cathers et al. | 114—67.1 |
| 3,207,113 | 9/1965 | Tattersall | 114—67.1 |

ANDREW H. FARRELL, *Primary Examiner.*